United States Patent [19]

Hamilton

[11] Patent Number: 5,400,993

[45] Date of Patent: Mar. 28, 1995

[54] ADJUSTABLE OVERHEAD SUSPENSION APPARATUS FOR TV AND VCR

[76] Inventor: Clifton Hamilton, 677 N. Howard St., Sabina, Ohio 45169

[21] Appl. No.: 111,715

[22] Filed: Aug. 17, 1993

[51] Int. Cl.[6] ............................................. E04G 3/00
[52] U.S. Cl. ................................. 248/278; 248/279; 248/919; 248/921
[58] Field of Search ............... 248/921, 922, 923, 919, 248/282, 283, 278, 280.1, 281.1, 279, 325, 323

[56] References Cited

U.S. PATENT DOCUMENTS

| | | | |
|---|---|---|---|
| 3,409,261 | 11/1968 | Leporati | 248/325 X |
| 4,447,031 | 5/1984 | Souder | 248/280.1 |
| 4,487,389 | 12/1984 | Ziegler | 248/922 X |
| 4,836,478 | 6/1989 | Sweere | 248/279 X |
| 4,836,486 | 6/1989 | Vossoughi | 248/278 X |
| 4,846,434 | 7/1989 | Krogsrud | 248/281.1 X |
| 4,964,606 | 10/1990 | Beam | 248/923 X |
| 4,993,676 | 2/1991 | Fitts et al. | 248/317 |
| 5,007,608 | 4/1991 | Carroll, Jr. | 248/297.2 |
| 5,009,384 | 4/1991 | Gerke et al. | 248/343 |
| 5,064,161 | 11/1991 | Anderson | 248/317 |
| 5,299,338 | 4/1994 | Foster | 248/282 X |

FOREIGN PATENT DOCUMENTS 8501648  4/1985  WIPO ..................... 248/922

*Primary Examiner*—J. Franklin Foss
*Attorney, Agent, or Firm*—John R. Flanagan

[57] ABSTRACT

An adjustable overhead suspension apparatus for a TV and a VCR includes an overhead support assembly mountable to a support structure, such as a ceiling or wall, a platform adapted to support a TV thereon, a pair of main bracket clamps attached to opposite ends of the platform and being adjustable in height for extending along opposite sides and engaging opposite top edges of the TV, fasteners for adjustably tightening the overhead support assembly to one of the platform and main bracket clamps to hold the TV at a desired tilted position about a horizontal axis, and a pair of auxiliary bracket clamps attached to and suspended below the platform and being adapted to support a VCR below the TV.

20 Claims, 2 Drawing Sheets

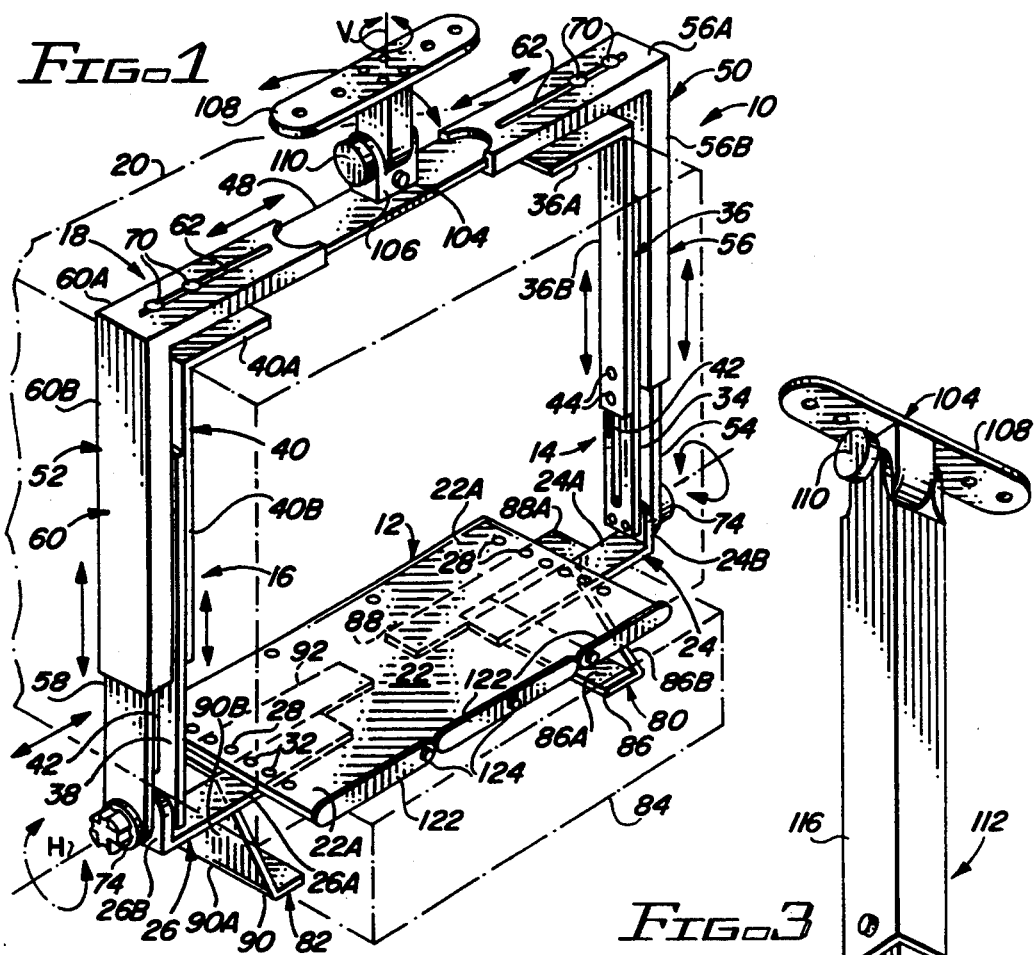

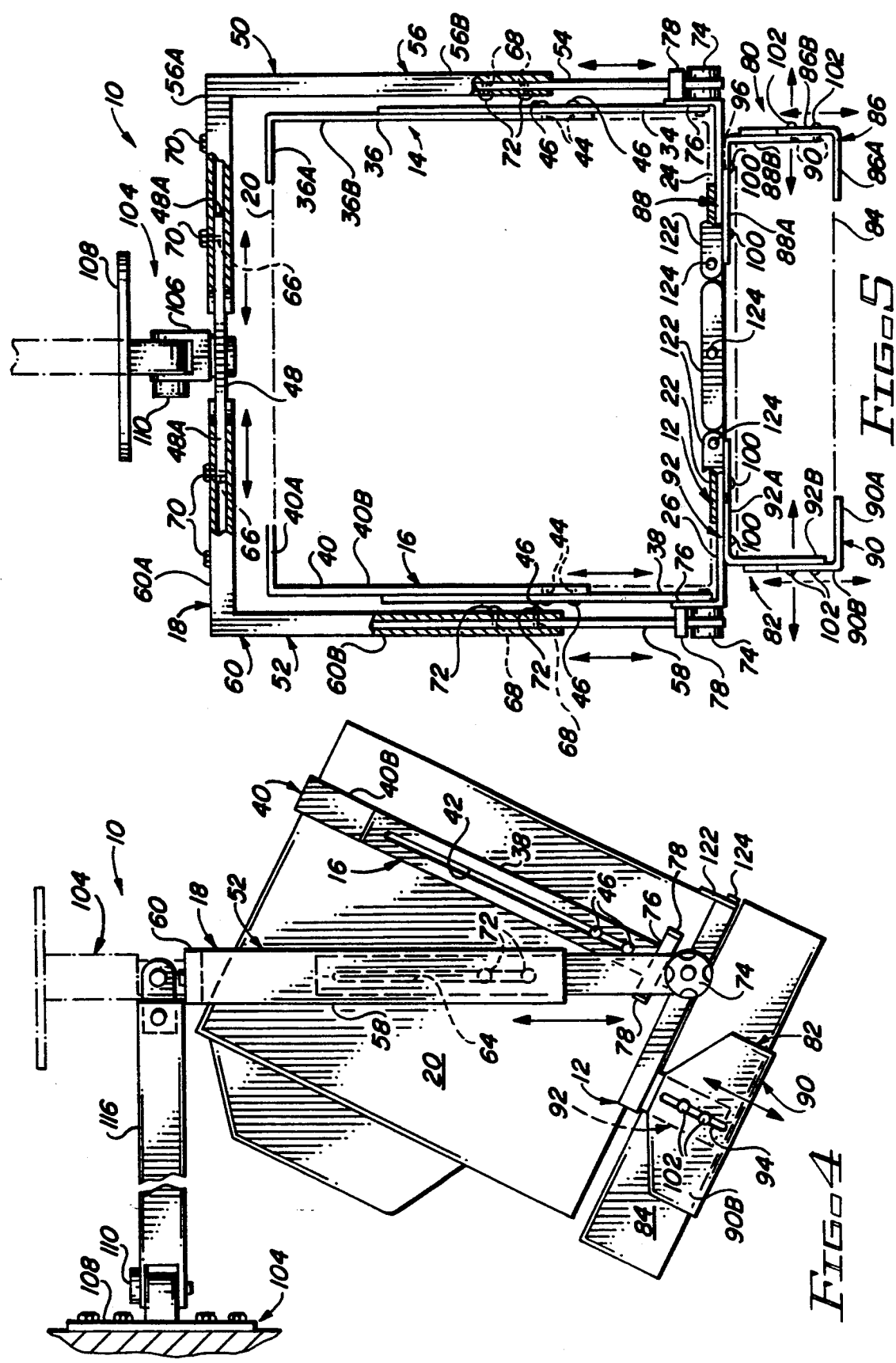

1

ADJUSTABLE OVERHEAD SUSPENSION APPARATUS FOR TV AND VCR

BACKGROUND OF THE INVENTION

Field of the Invention

The present invention generally relates to overhead suspension brackets and, more particularly, is concerned with an adjustable overhead suspension apparatus for a television set (TV) and video cassette recorder (VCR) player.

Description of the Prior Art

Brackets have been proposed in the prior patent art for suspending and supporting TVs from ceilings and walls. These ceiling and wall mounted brackets have mostly found application in buildings which accommodate the public, such as hotels, hospitals, schools and the like. Representative of these brackets are the ones disclosed in U.S. Pat. Nos. to Fitts et al (4,993,676), Carroll, Jr. (5,007,608), Gerke et al (5,009,384) and Anderson (5,064,161). In view that most prior art brackets are intended primarily for use in these public facilities, they tend to have limited versatility in terms of side-to-side and up-and-down adjustability for accommodating many different angles of viewing.

For ceiling and wall mounted TV and VCR supporting brackets to be suitable for home use they must be relatively easy to install and must be capable of adjustment to a range of different viewing angles while still securely supporting and suppending the TV and VCR.

Consequently, a need still exists for an overhead suspension apparatus which will overcome the limitations of the prior art brackets so as to be applicable to both public and residential facilities.

SUMMARY OF THE INVENTION

The present invention provides an adjustable overhead suspension apparatus designed to satisfy the aforementioned need. The adjustable overhead suspension apparatus of the present invention is relatively easy to install and is capable of supporting a TV and VCR either from a ceiling or wall. The apparatus also is capable of adjustment from side-to-side and up-and-down for permitting viewing from a range of different angles while still supporting and suppending the TV and VCR in a secure manner.

Accordingly, the present invention is directed to an adjustable overhead suspension apparatus which comprises: (a) a platform adapted to support a TV thereon; (b) a pair of main bracket clamps attached to opposite ends of the platform and being adjustable in height for extending along opposite sides and engaging opposite top edges of the TV so as to clamp the TV upon the platform; (c) an overhead support assembly mountable to a support structure; and (d) means for adjustably attaching the overhead support assembly to one of the platform and main bracket clamps to hold the TV at a desired tilted position about a horizontal axis.

The overhead suspension apparatus also comprises a pair of auxiliary bracket clamps attached to and suspended below the platform and being adapted to support a VCR below the TV. The overhead suspension apparatus further comprises an elongated arm assembly adapted to connect with and mount the overhead support assembly from either a ceiling or wall support structure.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of an adjustable overhead suspension apparatus of the present invention for mounting to a ceiling.

FIG. 2 is a front elevational view of the overhead suspension apparatus of FIG. 1.

FIG. 3 is a side elevational view of the overhead suspension apparatus of FIG. 1.

FIG. 4 is a perspective view of an alternate arrangement in which an elongated arm assembly is provided to mount the overhead suspension apparatus of FIG. 1 to a wall.

FIG. 5 is a perspective view of the elongated arm of FIG. 4 mounting the overhead suspension apparatus of FIG. 1 to the ceiling.

DETAILED DESCRIPTION OF THE INVENTION

Referring to the drawings and particularly to FIG. 1, there is illustrated an adjustable overhead suspension apparatus of the present invention, generally designated 10, for holding a TV and a VCR (shown in dashed outline form) or other components of comparable sizes. Basically, the overhead suspension apparatus 10 includes a platform 12, a pair of main bracket clamps 14, 16, and an overhead support assembly 18.

Referring to FIGS. 1, 4 and 5, the platform 12 of the apparatus 10, adapted to support a TV 20 thereon, includes a substantially flat base plate 22 and a pair of extension arms 24, 26. The base plate 22 has a plurality of internally threaded holes 28 defined in a pair of opposite end portions 22A of the base plate 22. Each extension arm 24, 26 has a main portion 24A, 26A and an upturned end portion 24B, 26B attached on one end of the main portion 24A, 26A. The main portions 24A, 26A are adapted to underlie the base plate 22, while the upturned end portions 24B are adapted for attachment to respective lower ends of the main bracket clamps 14, 16 and the overhead support assembly 18.

The platform 12 also includes a plurality of complementary attaching elements for releasably attaching the extension arms 24, 26 and flat base plate 22 in superimposed relationship with the main portions of the extension arms 24, 26 disposed below the base plate 22. The complementary attaching elements include the internally threaded holes 28 defined in the opposite end portions 22A of the flat base 22, an elongated slot 30 defined in the main portion 24A, 26A of each of the extension arms 24, 26 and alignable with a pair of the holes 28 in each of the opposite end portions 22A of the base plate 22, and a pair of fasteners 32 extendable through the slot 30 of each extension arm 24, 26 and threadable into the pair of holes 28 for tightening the extension arms 24, 26 and the base plate 22 against one another in the superimposed relationship.

Referring still to FIGS. 1, 4 and 5, the main bracket clamps 14, 16 of the apparatus 10 are attached to opposite ends of the platform 12 and are adjustable in height so that the main bracket clamps 14, 16 can extend along the opposite sides of the TV 20 and engage opposite top edges thereof and clamp the TV 20 upon the platform 12. Each main bracket clamp 14, 16 includes a pair of lower and upper bracket arms 34, 36 and 38, 40. The lower bracket arms 34, 38 are attached at their lower ends to the respective upturned end portions 24B, 26B of the extension arms 24, 26. The lower bracket arms 34, 38 are extendable from their lower ends upwardly along the opposite sides of the TV 20. The upper bracket arms 36, 40 have top portions 36A, 40A adapted to overlie respective opposite top edges of the TV 20 and side portions 36B, 40B extendable downwardly along the opposite sides of the TV 20 and in side-by-side relationship to the lower bracket arms 34, 38.

Each main bracket clamp 14, 16 also includes a plurality of complementary securing elements for releasably securing the respective lower and upper bracket arms 34, 36 and 38, 40 together in the side-by-side relationships to match the distance between the platform 12 and top portion 36A, 40A of the upper bracket arm 36, 40 with the height of the TV 20 and thereby clamp the TV 20 upon the platform 12. The complementary securing elements include an elongated slot 42 defined in each of the lower bracket arms 34, 38, at least a pair of internally threaded apertures 44 defined in the side portion 36B, 40B of each of the upper bracket arms 36, 40 and being alignable with the slot 42, and a pair of fasteners 46 extendable through the slot 42 and threadable into the apertures 44 for tightening the lower and upper bracket arms 34, 36 and 38, 40 of each main bracket clamp 14, 16 against one another in the side-by-side relationship.

Referring to FIGS. 1-5, the overhead support assembly 18 of the apparatus 10, which is mountable to a support structure such as a ceiling or wall, includes an upper horizontal support member 48 and a pair of vertical support members 50, 52 slidably mounted at their upper ends to the opposite end portions 48A of the upper horizontal support member 48 for undergoing adjustable movement toward and away from each other. Each vertical support member 50, 52 of the overhead support assembly 18 includes lower and upper support arms 54, 56 and 58, 60. Each lower support arm 54, 58 of the vertical support members 50, 52 is attached at a lower end to one of the opposite ends of the platform 12 and extends upwardly along and is spaced outwardly from one of the opposite sides of the TV 20. Each upper support arm 56, 60 of the vertical support members 50, 52 has a hollow tubular configuration with an upper portion 56A, 60A adapted to overlie in spaced relationship a top portion of the TV 20 and a lower portion 56B, 60B which extends downwardly at a right angle to the upper portion 56A, 60A and along and spaced outwardly from one of the opposite sides of the TV 20. Each of the lower support arms 54, 58 is adapted to be received within the lower portion 56B, 60B of a corresponding one of the upper support arms 56, 60 in a telescopic interfitted relationship to adjustably change and set the combined length of the vertical support members 50, 52.

The overhead support assembly 18 also includes a plurality of complementary connecting elements adapted to releasably connect the upper portion 56A, 60A of the upper support arm 56, 60 of each of the vertical support members 50, 52 in telescoped relationship with one of the opposite end portions 48A of the upper horizontal support member 48 and also to releasably connect the lower support arms 54, 58 with the lower portions 56B, 60B of the upper support arms 56, 60 in the telescoped relationships. The securing elements include elongated slots 62 and 64 respectively defined in the upper and lower portions 56A, 56B and 60A, 60B of the upper support arms 56, 60 and pairs of internally threaded apertures 66 and 68 respectively defined in the opposite end portions 48A of the upper horizontal support member 48 and in the lower support arms 54, 58 which pairs of apertures 66 and 68 are aligned respectively with the slots 62 and 64. The securing elements also include pairs of fasteners 70 and 72 extendable through the respective slots 62 and 64 and being threadable into the respective apertures 66 and 68 for tightening the upper support arms 56, 60 to the upper horizontal support member 48 and the lower support arms 54, 58 to the upper support arms 56, 60 in the respective telescoped interfitted relationships.

Referring to FIGS. 1, 4 and 5, the overhead suspension apparatus 10 also includes means for adjustably tightly securing the lower ends of the vertical support members 50, 52 of the overhead support assembly 18 to the opposite ends of the platform 12 so as to hold the TV 20 at a desired tilted position about a horizontal axis H. The adjustably securing means is preferably a pair of adjustable fasteners 74 inserted through the lower ends of the vertical support members 50, 52 and threaded into the upturned end portions 24B, 26B of the extension arms 24, 26 of the platform 12.

Referring to FIGS. 4 and 5, the overhead suspension apparatus 10 further includes means defined on the lower ends of the lower bracket arms 34, 38 for limiting the tilting of the main bracket clamps 14, 16 and platform 12 therewith relative to the overhead support assembly 18. The tilt limiting means is in the form of a bracket 76 mounted to upturned end portion 24B, 26B of each of the extension arms 24, 26 and having a pair of end tabs 78 attached to and projecting therefrom. The tabs 78 extend outwardly past the respective lower ends of the overhead support assembly 18 so as to provide stops blocking and thus limiting pivotal movement of the main bracket clamps 14, 16 and platform 12 and thereby the TV 20 thereon to a predetermined tilt angle, such as 30°, in forward and backward directions relative to the overhead support assembly 18.

Referring to FIGS. 1, 4 and 5, the overhead suspension apparatus 10 still further includes a pair of auxiliary bracket clamps 80, 82 attached to and suspended below the platform 12 and being adapted to thereby support a VCR 84 below the TV 20 on the platform 12. Each auxiliary bracket clamp 80, 82 includes a pair of lower and upper mounting arms 86, 88 and 90, 92. The lower mounting arms 86, 90 have respective bottom portions 86A, 90A adapted to underlie the respective opposite bottom edges of the VCR 84 and respective side portions 86B, 90B attached normal to the bottom portions 86A, 90A and adapted to extend upwardly along the respective opposite sides of the VCR 84. The upper mounting arms 88, 92 have respective top portions 88A, 92A attached under respective opposite end portions 22A of the base plate 22 of the platform 12 and respective side portion 88B, 92B adapted to extend downwardly along the respective opposite sides of the VCR 84 and the respective side portions 86B, 90B of the lower mounting arms 86, 90.

Each auxiliary bracket clamp 80, 82 also include a plurality of complementary fastening elements adapted to releasably fasten the upper mounting arms 88, 92 to the platform 12 and to releasably fasten the lower and upper mounting arms 86, 88 and 90, 92 together to match the distance between the platform 12 and bottom portions 86A, 90A of the lower mounting arms 86, 90 with the height of the VCR 84 and thereby clamp the VCR 84 below the platform 12. The complementary fastening elements include elongated slots 94 respectively defined in the side portions 86B, 90B of the lower mounting arms 86, 90 and pairs of internally threaded apertures 96 and 98 respectively defined in the top and side portions 88A, 88B and 92A, 92B of the upper mounting arms 86, 90. The respective pairs of apertures 96 and 98 are aligned with respective holes 28 in the base plate 22 and slots 94 in the side portions 86B, 90B of the lower mounting arms 86, 90. The fastening elements also include pairs of fasteners 100 and 102 extendable and threadably through the apertures 96, 28 and apertures 98 and slots 94 respective slots 62 and 64 for tightening the upper mounting arms 88, 92 both to the base plate 22 and to the lower mounting arms 86, 90.

Referring to FIGS. 1-5, the overhead suspension apparatus 10 also includes two alternative ways of mounting the TV 20 and VCR 84, either to a ceiling or vertical wall for pivotal movement about a vertical axis V. In FIGS. 1 and 5, the apparatus 10 employes a connector 104 having a clevis 106 rotatably mounted about the vertical axis V to the center of the upper horizontal member 48 of the overhead support assembly 18, a mounting bracket 108 with a tongue member 110 connected to the clevis 106 by a fastener pin 110.

In FIGS. 2-4, the apparatus 10 employs an elongated articulated arm assembly 112 adapted to connect with and mount the overhead support assembly 18 from either a ceiling or wall support structure. The arm assembly 112 includes a first arm member 114 attached at one end to the overhead support assembly 18, a second arm member 116 being longer than the first arm member 114, a connector substantially the same as the aforementioned mounting bracket 108 and fastening pin 110 pivotally connected to an end of the second arm member 116 and mountable to either the ceiling or wall support structure member. The arm assembly 112 also includes a coupler 118 attached to the other ends of the first and second arm members 114, 116 and defining a pivotal joint 120 therebetween.

Referring to FIGS. 1, 4 and 5, the overhead suspension apparatus 10 further includes a plurality of front rail elements 122 pivotally mounted by fasteners 124 along the front edge of the base plate 22 of the platform 18. The rail elements 122 can be pivotally adjusted to positions extending inclined above the platform 12 so as to function as a stop preventing the TV 20 from moving forwardly relative to the platform 12.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. An overhead suspension apparatus for a television set (TV) and a video cassette recorder player (VCR), said apparatus comprising:
   (a) a platform adapted to support a TV thereon;
   (b) a pair of main bracket clamps attached to opposite ends of said platform and being adjustable in height for extending along opposite sides and engaging opposite top edges of the TV so as to clamp the TV upon said platform;
   (c) an overhead support assembly mountable to a support structure;
   (d) means for adjustably tightly securing said overhead support assembly to one of said platform and main bracket clamps to hold the TV at a desired tilted position about a horizontal axis; and
   (e) a pair of auxiliary bracket clamps attached to and Suspended below said platform and being adapted to support a VCR below the TV.

2. The apparatus of claim 1 further comprising:
   a pair of auxiliary bracket clamps attached to and suspended below said platform and being adapted to support a VCR below the TV.

3. The apparatus of claim 1 wherein each of said auxiliary bracket clamps includes:
   a lower mounting arm having a bottom portion adapted to overlie one of the opposite bottom edges of the VCR and a side portion adapted to extend upwardly along one of the opposite sides of the VCR;
   an upper mounting arm having a top portion attached under one of said opposite ends of said platform and a side portion adapted to extend downwardly along one of the opposite sides of the VCR and said side portion of said lower mounting arm; and
   complementary fastening elements adapted to releasably fasten said lower and upper mounting arms in side-by-side relationship to match the distance between said platform and bottom portion of said lower mounting arm with the height of the VCR so as to thereby clamp the VCR below said platform.

4. The apparatus of claim 3 wherein said complementary fastening elements includes:
   an elongated slot defined in one of said lower bracket arm and said side portion of said upper bracket arm;
   at least a pair of internally threaded apertures defined in the other of said lower bracket arm and said side portion of said upper bracket art in alignment with said slot; and
   at least a pair of fasteners extendable through said slot and threadable into said apertures for tightening said lower and upper bracket arms against one another.

5. An overhead suspension apparatus for a television set (TV) and a video cassette recorder player (VCR), said apparatus comprising:
   (a) a platform adapted to support a TV thereon;
   (b) a pair of main bracket clamps attached to opposite ends of said platform and being adjustable in height for extending along opposite sides and engaging opposite top edges of the TV so as to clamp the TV upon said platform;
   (c) an overhead support assembly mountable to a support structure; and
   (d) means for adjustably tightly securing said overhead support assembly to one of said platform and main bracket clamps to hold the TV at a desired tilted position about a horizontal axis;
   (e) each of said main bracket clamps including
      (i) a lower bracket arm attached at a lower end to one of said opposite ends of said platform and extendable upwardly along one of the opposite sides of the TV;
      (ii) an upper bracket arm having a top portion adapted to overlie one of the opposite top edges of the TV and a side portion extendable downwardly along one of the opposite sides of the TV; and (iii) complementary securing elements adapted to releasably secure said lower and upper bracket arms in side-by-side relationship to match the distance between said platform and top portion of said upper bracket with the height of the TV so as to thereby clamp the TV upon said platform.

6. The apparatus of claim 5 wherein said complementary securing elements includes:

an elongated slot defined in one of said lower bracket arm and said side portion of said upper bracket arm;

at least a pair of internally threaded apertures defined in the other of said lower bracket arm and said side portion of said upper bracket art in alignment with said slot; and at least a pair of fasteners extendable through said slot and threadable into said apertures for tightening said lower and upper bracket arms against one another.

7. The apparatus of claim 5 further comprising:

an elongated articulated arm assembly adapted to connect with and mount said overhead support assembly from either a ceiling or wall support structure.

8. An overhead suspension apparatus for a television set (TV) and a video cassette recorder player (VCR), said apparatus comprising:

(a) a platform adapted to support a TV thereon;
(b) a pair of main bracket clamps attached to opposite ends of said platform and being adjustable in height for extending along opposite sides and engaging opposite top edges of the TV so as to clamp the TV upon said platform;
(c) an overhead support assembly mountable to a support structure;
(d) means for adjustably tightly securing said overhead support assembly to one of said platform and main bracket clamps to hold the TV at a desired tilted position about a horizontal axis; and
(e) an elongated articulated arm assembly adapted to connect with and mount said overhead support assembly from either a ceiling or wall support structure, said arm assembly including
 (i) a first arm member having a pair of opposite ends and being adapted at one of said oppoiste ends to attach to said overhead support assembly;
 (ii) a second arm member having a pair of opposite ends and being longer than said first arm member;
 (iii) a connector adapted to be mounted to either the ceiling or wall support structure and pivotally connected to one of said opposite ends of said second arm member; and
 (iv) a coupler attached to the others of said opposite ends of said first and second arm members and defining a pivotal joint therebetween.

9. An overhead suspension apparatus for a television set (TV) and a video cassette recorder player (VCR), said apparatus comprising:

(a) a platform adapted to support a TV thereon;
(b) a pair of main bracket clamps attached to opposite ends of said platform and being adjustable in height for extending along opposite sides and engaging opposite top edges of the TV so as to clamp the TV upon said platform;
(c) an overhead support assembly mountable to a support structure; and
(d) means for adjustably tightly securing said overhead support assembly to one of said platform and main bracket clamps to hold the TV at a desired tilted position about a horizontal axis;
(e) said platform including
 (i) a substantially flat base plate having pluralities of internally threaded holes defined in a pair of opposite end portions of said base plate,
 (ii) a pair of extension arms each having a main portion adapted to underlie said base plate and an upturned end portion attached on one end of said main portion and adapted for attachment to respective ends of said main bracket clamps and said overhead support assembly; and
 (iii) complementary attaching elements adapted to releasably attach each of said extension arms and said flat base in superimposed relationship to one another.

10. The apparatus of claim 9 wherein said complementary attaching elements includes:

an elongated slot defined in said main portion of each of said extension arms being alignable with at least a pair of said internally threaded holes defined in one of said end portions of said flat base; and at least a pair of fasteners extendable through said slot and threadable into said holes for tightening said extension arm and base plate against one another.

11. An overhead suspension apparatus for a television set (TV) and a video cassette recorder player (VCR), said apparatus comprising:

(a) a platform adapted to support a TV thereon;
(b) a pair of main bracket clamps attached to opposite ends of said platform and being adjustable in height for extending along opposite sides and engaging opposite top edges of the TV so as to clamp the TV upon said platform;
(c) an overhead support assembly mountable to a support structure; and
(d) means for adjustably tightly securing said overhead support assembly to one of said platform and main bracket clamps to hold the TV at a desired tilted position about a horizontal axis;
(e) said overhead support assembly including
 (i) an upper horizontal member, and
 (ii) a pair of vertical support members slidably mounted at their upper ends to the opposite ends of the horizontal member for undergoing adjustable movement toward and away from each other.

12. The apparatus of claim 11 wherein each of said vertical support members of said overhead support assembly includes:

a lower support arm attached at a lower end to one of said opposite ends of said platform and extendable upwardly along and spaced outwardly from one of the opposite sides of the TV;

an upper support arm having an upper portion adapted to overlie in spaced relationship a top of the TV and a lower portion orthogonal to said upper portion thereof and extendable downwardly along and spaced outwardly from one of the opposite sides of the TV, said lower support arm and lower portion of said upper support arm being adapted to telescopically interfit with one another to adjustably changing and setting the combined length of said vertical support member; and complementary connecting elements adapted to releasably connect said upper portion of each of said vertical support members to one of said opposite ends of said horizontal support member and to releasably connect said lower support arm and lower portion of said upper support arm in the telescoped relationship together.

13. An overhead suspension apparatus for a television set (TV) and a video cassette recorder player (VCR), said apparatus comprising:

(a) a platform adapted to support a TV thereon;

(b) a pair of main bracket clamps attached to opposite ends of said platform and being adjustable in height for extending along opposite sides and engaging opposite top edges of the TV so as to clamp the TV upon said platform;

(c) an overhead support assembly mountable to a support structure; and (d) a pair of threaded fasteners for adjustably tightly securing said overhead support assembly to one of said platform and main bracket clamps to hold the TV at a desired tilted position about a horizontal axis.

14. The apparatus of claim 13 further comprising:

means for limiting the tilting of said main bracket clamps and platform relative to said overhead suspension assembly.

15. An overhead suspension apparatus for a television set (TV) and a video cassette recorder player (VCR), said apparatus comprising:

(a) a platform adapted to support a TV thereon;

(b) a pair of main bracket clamps attached to opposite ends of said platform and being adjustable in height for extending along opposite sides and engaging opposite top edges of the TV so as to clamp the TV upon said platform;

(c) an overhead support assembly mountable to a support structure;

(d) means for adjustably tightly securing said overhead support assembly to one of said platform and main bracket clamps to hold the TV at a desired tilted position about a horizontal axis; and (e) means for limiting the tilting of said main bracket clamps and platform relative to said overhead suspension assembly, said tilting limiting means including a pair of tabs mounted to each opposite end of said platform and extending past one of a pair of lower ends of said overhead support assembly so as to provide stops limiting pivotal movement of said platform and thereby the TV thereon to a predetermined tilt angle in forward and backward directions relative to said overhead support assembly.

16. An overhead suspension apparatus for a television set (TV) and a video cassette recorder player (VCR), said apparatus comprising:

(a) a platform adapted to support a TV thereon;

(b) a pair of main bracket clamps attached to opposite ends of said platform and being adjustable in height for extending along opposite sides and engaging opposite top edges of the TV so as to clamp the TV upon said platform, each of said main bracket clamps including (i) a lower bracket arm attached at a lower end to one of said opposite ends of said platform and extendable upwardly along one of the opposite sides of the TV, and (ii) an upper bracket arm having a top portion adapted to overlie one of the opposite top edges of the TV and a side portion extendable downwardly along one of the opposite sides of the T and attachable to said lower bracket arm;

(c) an overhead support assembly mountable to a support structure;

(d) means for adjustably tightly securing said overhead support assembly to one of said platform and main bracket clamps to hold the TV at a desired tilted position about a horizontal axis; and (e) a pair of auxiliary bracket clamps attached to and suspended below said platform and being adapted to support a VCR below the TV, each of said auxiliary bracket clamps including (i) a lower mounting arm having a bottom portion adapted to overlie one of the opposite bottom edges of the VCR and a side portion adapted to extend upwardly along one of the opposite sides of the VCR, and (ii) an upper mounting arm having a top portion attached under one of said opposite ends of said platform and a side portion adapted to extend downwardly along one of the opposite sides of the VCR and said side portion of said lower mounting arm and attachable to said side portion of said lower mounting arm.

17. The apparatus of claim 16 further comprising:

an elongated articulated arm assembly adapted to connect with and mount said overhead support assembly from either a ceiling or wall support structure.

18. The apparatus of claim 17 wherein said arm assembly includes:

a first arm member having a pair of opposite ends and being adapted at one of said opposite ends to attach to said overhead support assembly;

a second arm member having a pair of opposite ends and being longer than said first arm member;

a connector adapted to be mounted to either the ceiling or wall support structure and pivotally connected to one of said opposite ends of said second arm member; and a coupler attached to the others of said opposite ends of said first and second arm members and defining a pivotal joint therebetween.

19. The apparatus of claim 16 wherein said platform includes:

a substantially flat base plate having a plurality of internally threaded holes defined in a pair of opposite end portions of said base plate;

a pair of extension arms each having a main portion adapted to underlie said base plate and an upturned end portion attached on one end of said main portion and adapted for attachment to respective ends of said main bracket clamps and said overhead support assembly; and complementary attaching elements adapted to releasably attach each of said extension arms and said flat base in superimposed relationship to one another.

20. The apparatus of claim 16 wherein said overhead support assembly includes:

an upper horizontal member; and a pair of vertical support members slidably mounted at their upper ends and attachable to the opposite ends of the horizontal member for undergoing adjustable movement toward and away from each other, each of said vertical support members of said overhead support assembly including
(i) a lower support arm attached at a lower end to one of said opposite ends of said platform and extendable upwardly along and spaced outwardly from one of the opposite sides of the TV, and
(ii) an upper support arm having an upper portion adapted to overlie in spaced relationship a top of the TV and a lower portion extendable downwardly along and spaced outwardly from one of the opposite sides of the TV, said lower support arm and lower portion of said upper support arm being adapted to telescopically interfit and fasten with one another to adjustably changing and setting the combined length of said vertical support member.

* * * * *